(No Model.)

F. J. KALDENBERG
UMBRELLA STICK.

No. 303,646. Patented Aug. 19, 1884.

Attest:
John A. Ellis
Herman G. Loew

Inventor:
Frederick J. Kaldenberg
By H. Newell
his Atty.

UNITED STATES PATENT OFFICE.

FREDERICK J. KALDENBERG, OF NEW YORK, N. Y.

UMBRELLA-STICK.

SPECIFICATION forming part of Letters Patent No. 303,646, dated August 19, 1884.

Application filed October 25, 1883. (No model.)

*To all whom it may concern:*

Be it known that I, FREDERICK J. KALDENBERG, a citizen of the United States, residing at New York, in the county and State of New York, have invented certain new and useful Improvements in Umbrella and Parasol Sticks, of which the following is a specification.

My improvement relates to certain devices for attaching the handles of umbrellas to their sticks; and the objects of my invention are, first, to provide an umbrella or parasol stick or staff with a movable handle adapted to serve the purpose of a tip-cup to confine the ribs, and, second, to afford means whereby the handle is easily secured to the stick, so as to effect an interchange of handles of different styles.

Figure 1:
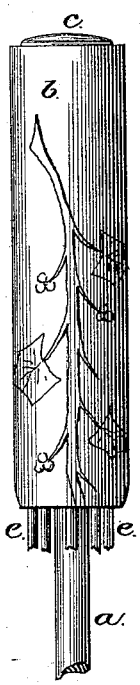
Figure 2:
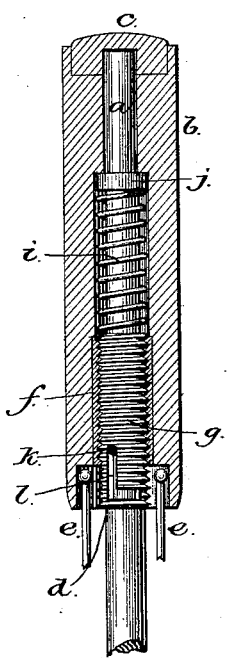

In the accompanying drawings, which serve to illustrate my invention, Figure 1 is an elevation of an umbrella stick and handle made according to my improvement. Fig. 2 is a similar view with the handle in section; and Fig. 3 is a longitudinal section of the same, but showing a different form of handle.

Let *a* represent the long stick or staff of an umbrella for mounting the frame, which may be made of wood or metal, and either tubular or solid, as desired. The handle *b*, which is shown in Fig. 1 as of a cylindrical form, is recessed to fit over the stick *a*, and has its outer end closed by a cap, *c*. Near the lower end of the handle is provided a shoulder, *d*, and the bore or recess is enlarged sufficiently to form a cap to receive the tips *e* of the ribs when the umbrella is folded up, as shown in Fig. 1. An interiorly screw-threaded ring, *f*, is secured within the recess in the handle. On the stick *a* is arranged a loose sleeve, *g*, having an exterior screw-threaded surface corresponding to the thread on the handle. The annular shoulder *d*, formed on the stick, limits the downward movement of this sleeve.

*i* is a spring arranged on the stick *a*, between the sleeve *g* and projection *j*.

Figure 3:
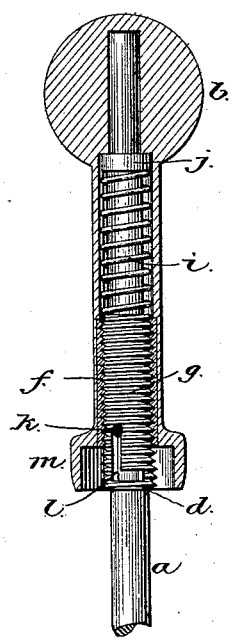

In Fig. 1 a straight cylindrical handle is shown, and a screw-threaded ring is secured within the recess to engage with the threaded sleeve on the stick; but this is used only with handles of large diameter, as in other forms—such as are shown in Fig. 3—the thread is cut in the handle itself. A short pin or stud, *k*, is provided on the stick *a*, and in the sleeve *g* is formed one or more L-shaped slots, *l*. As the handle is moved up or down, the pin traverses the straight portion of the slot, and by a slight turn of the handle the pin will enter the transverse portion and the handle will be locked in an elevated position. In Fig. 3 another form of handle is illustrated, having a closed ball-shaped top and an enlarged recessed lower end, forming a cup-shape cavity or tip-receiver, *m*. If preferred, this portion may be made separate and be attached to the handle. In all the views the handle is shown in its normal position, with its lower end embracing the tips of the umbrella. To effect the release of the tips the handle is drawn upward, and if it is desired to secure it in its elevated position above the tips it is turned slightly, so that the pin will enter the lower end of the slot in the sleeve.

By unscrewing the handle it may be removed, and any other form may be substituted therefor on the stick, thus enabling different styles of handles to be applied to the same stick, when desired.

What I claim as my invention, and desire to secure by Letters Patent, is—

1. The combination, with an umbrella-stick, of a handle having a cavity to receive the tips, and provided with a screw-threaded socket, and a screw-threaded sleeve adapted to slide on the stick for engaging with said handle, as and for the purpose set forth.

2. The combination, with the stick *a*, having shoulder *d*, of the sleeve *g*, cylindrical handle *b*, with cap *c*, and inserted ring *f*, to engage with the sleeve, as and for the purpose set forth.

3. In an umbrella, the combination, with the stick, of a longitudinally-movable handle having a cup-shaped cavity to receive the tips of the ribs when the umbrella is folded up, and a spring for actuating said handle, substantially as set forth.

4. The combination of the stick *a*, provided with the shoulder *d*, exterior screw-threaded sleeve, *g*, and handle *b*, having a screw-threaded cavity, as and for the purpose set forth.

5. The combination of the stick *a*, having stud or pin *k*, sleeve *g*, provided with one or more L-shaped slots, and handle *b*, secured to said sleeve, and adapted to have a longitudinal movement, as set forth.

FRED. J. KALDENBERG.

Witnesses:
LEWIS P. WARTH,
JULIUS ZEISS.